Oct. 25, 1966     L. A. WARNER     3,280,464
UNIVERSAL NAVIGATIONAL PLOTTER
Filed Nov. 5, 1964
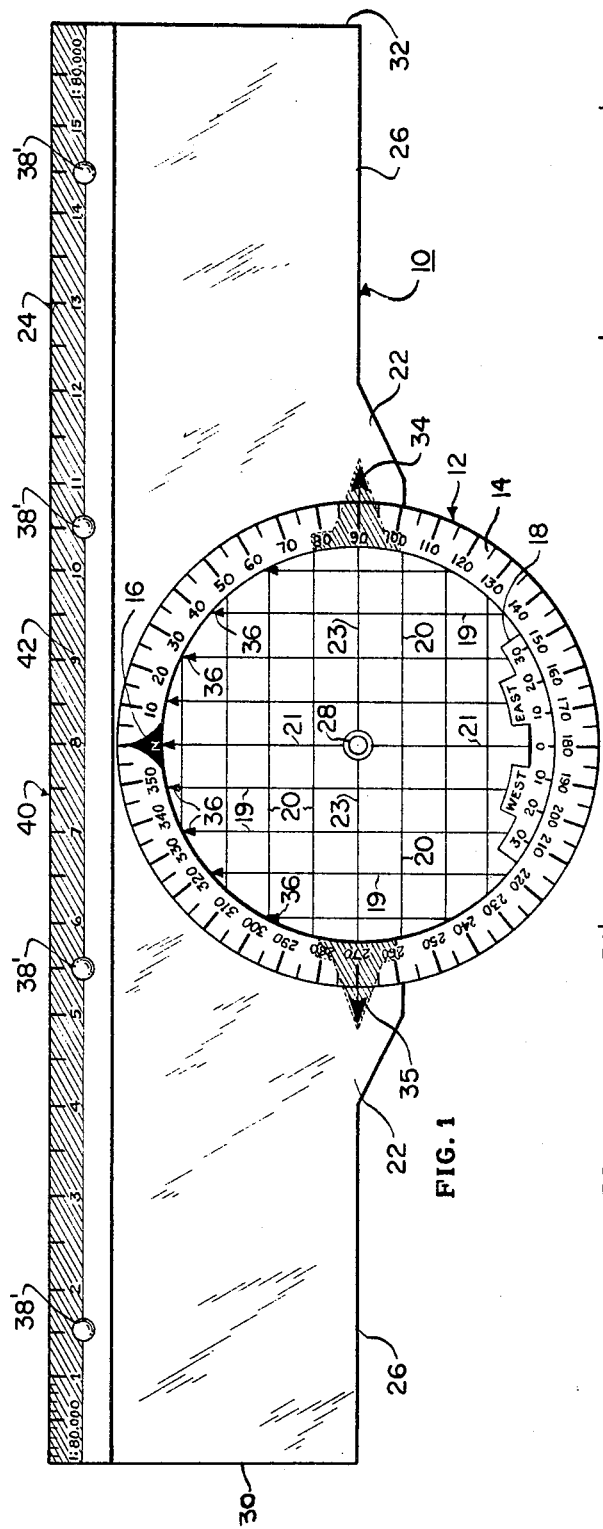
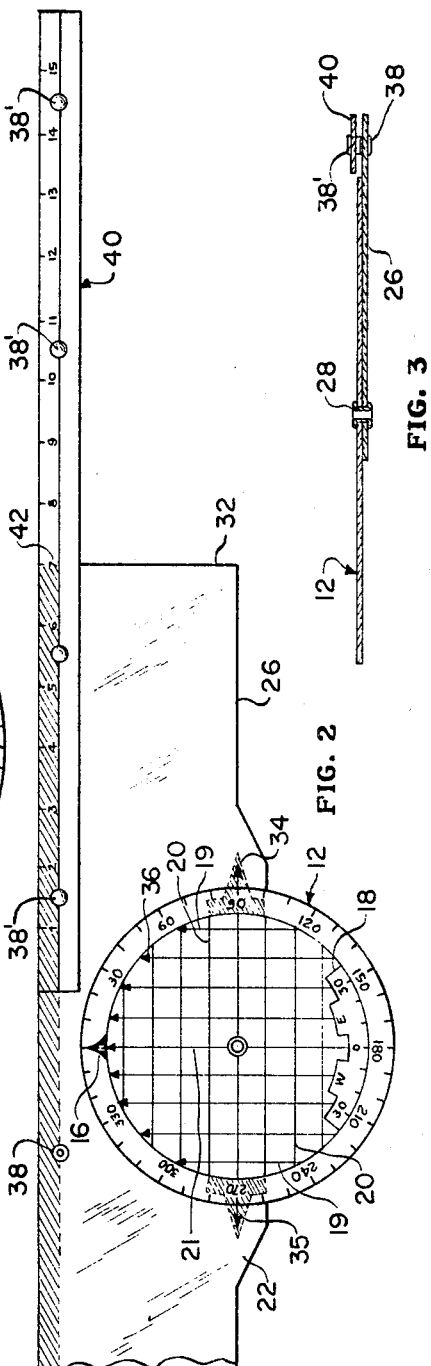
INVENTOR.
LOUIS A. WARNER
BY
ATTORNEYS

United States Patent Office 3,280,464
Patented Oct. 25, 1966

3,280,464
UNIVERSAL NAVIGATIONAL PLOTTER
Louis A. Warner, 5223 N. Natoma Ave., Chicago, Ill.
Filed Nov. 5, 1964, Ser. No. 409,201
11 Claims. (Cl. 33—75)

This invention relates to a course and distance plotting device for use in navigation. More particularly, this invention relates to a navigation plotter which is universally applicable for both marine and air navigation to derive true courses and distances when used in conjunction with an appropriate chart.

Navigational plotters are generally designed for only a single application, that is, for marine navigation or for air navigation, since the distance scales thereon are necessarily calibrated for either marine charts or for air charts and hence are radically different. These navigational plotters therefore have a limited application. Furthermore, as it is well known, the scale of these marine charts and air charts vary considerably, depending on the detail desired and on the particular type of chart being used. For example, the marine charts may be scaled at either 1:40,000 or 1:80,000, and the air charts may be scaled at either 1:500,000 or 1:1,000,000; depending upon the particular type of chart. These navigational plotters therefore must have one or more scales printed thereon, or else a separate, or different, navigational plotter which is scaled to a particular chart must be provided for each of the differently scaled charts. The first mentioned types of navigational plotters are generally undesirable since the many scales printed thereon makes it difficult to determine quickly which one of the many scales is to be used. The second mentioned alternative is undesirable since a pilot, whether a marine pilot or an aircraft pilot, may use a number of differently scaled charts during one outing, for example when going in and out of a harbor or when flying from one airport to another which is some distance away, and hence he must have available a separate navigational plotter which is scaled to each of the different charts he may use. The pilot must therefore incur the expense of obtaining these different plotters, as well as to keep each of them conveniently available.

A still further disadvantage of the navigational plotters presently available is the limited distances which can be measured, without having to reposition them on the chart with which they are used. By the same token, since only a maximum limited distance can be measured, the plotter must be repositioned to plot a course between two points which are at greater distance.

It is therefore an object of the present invention to provide an improved navigational plotter.

It is a further object to provide an improved navigational plotter having mechanical means for correcting compass errors, and for converting true directions to compass directions.

It is still another object to provide an improved navigational plotter having a protractor component which may be easily and speedily oriented to true, magnetic, or compass direction heading.

It is still another object to provide an improved navigational plotter which is adapted and constructed so that it may be used to measure distances on all charts. In this respect, it is still another object to provide an improved navigational plotter which is adapted and constructed so that it may be easily and speedily extended to measure distances and to plot courses longer than heretofore generally possible with presently available plotters.

It is still another object to provide an improved navigational plotter which is constructed for maximum readability, while obscuring a minimum amount of chart detail.

It is still another object to provide an improved navigational ploter which requires a minimum of manipulation to plot directions and distances required in navigation, and which manipulations can be accomplished in one continuous operation.

Other objects of the invention will in part be obvious and will in part appear hereinafter.

The above outlined objectives are accomplished by means of the navigational plotter, disclosed in detail hereinafter, which generally comprises a circular protractor having a compass rose adjacent its peripheral edge, which compass rose is calibrated from zero to 360 degrees. A rectangular member is pivoted at the center of the circular protractor, at a point which is preferably centrally positioned between the ends of the rectangular member and along one of its longitudinal edges.

The circular protractor is marked with a plurality of horizontal and vertical grid lines, which are parallel to the east-west and the north-south directions of the compass rose, respectively. As will be apparent from the detailed description hereinafter, these grid lines may be used to easily and speedily orient the protractor to the true meridian on the chart with which the plotter is being used. The circular protractor also is marked with an auxiliary zero to 30 degrees West-East scale, adjacent the aforesaid compass rose scale and in cooperative relationship therewith, to enable mechanical adjustment of the protractor to include corrections for magnetic variation and deviation.

The upper longitudinal edge of the rectangular member is unobstructed and thereby provides a straight line for drawing course lines. Atop the rectangular member, adjacent the upper longitudinal edge, is a detachable distance scale; which scale may be easily and speedily changed so that a distance scale properly calibrated in accordance with the scale of the chart with which the plotter is being used may be removably secured to the plotter. The plotter is also constructed so that the detachable distance scales can be secured thereto in a manner such that the upper longitudinal edge can be extended, so that longer courses can be plotted and measured, without the necessity of moving, or repositioning, the plotter. Each of the distance scales removably attachable to the rectangular member preferably has only one scale marked on it, hence confusion as to which scale is to be used is eliminated. The rectangular member has opaquing which lies only under the scale of the attached distance scale and along the lower longitudinal edge under the compass rose, hence only those areas are highlighted and a minimum amount of chart detail is obstructed.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawing.

FIGURE 1 is a top plan view of a navigational plotter exemplary of the present invention;

FIGURE 2 is a top plan view of the navigational plotter of FIG. 1, with the scale thereon positioned for measuring and plotting longer courses; and FIGURE 3 is a sectional view taken along line 3—3 of FIG. 1.

Similar reference charatcers refer to similar parts throughout the several views of the drawing.

Referring now to the drawing, a universal navigational plotter 10 exemplary of the present invention is shown comprising a circular protractor 12 which has a compass rose 14 adjacent its peripheral edge; the compass rose 14 being calibrated from zero to 360 degrees, with the zero and 360th calibration corresponding to north of the compass rose and indicated accordingly by means of a large arrowhead 16 having a capital N printed thereon. The 90th, 180th and 270th calibrations, of course, correspond to East, South and West of the compass rose, respectively. Adjacent the compass rose 14 is an auxiliary West-East scale 18, calibrated in degrees from zero to 30 in both the west and the east directions, which scale is cooperatively related with the South reference of a chart, or the 180th calibration of the compass rose 14, to enable mechanical adjustment of the protractor 12 to provide corrections for magnetic variation and deviation, in a manner explained more fully hereinafter. A number of grid lines 19 and 20, extending parallel to a line 21 between the zero, or 360th, and the 180th calibration and a line 23 between the 90th and 270th calibration, respectively, form a rectangular grid on the face of the protractor 12, for orienting the protractor to True North. Each of the north-south grid lines 19 has an arrowhead 36 on its one end to clearly indicate the proper True North heading.

A rectangular member 22 having two parallel longitudinal upper and lower edges 24 and 26, respectively, is pivotally secured by means of a rivet 28 or the like at the center of the circular protractor 12. The pivotal connection is preferably made at a point centrally positioned between the ends 30 and 32 of the rectangular member and along the lower longitudinal edge 26, so that the edge 26 when moved across the various diameters of the compass rose 14, indicates the various course readings and their diametrically opposite 180-degree reciprocal readings. The rectangular member 22 has opaque indicators 34 and 35, each of which has a direction arrow thereon, at these diametrically opposed positions which are formed, or shaped, so as to highlight the direction arrows and approximately 20 degrees of the calibration of the compass rose 14 at each of these positions. The course reading can therefore be readily determined, since a sufficient portion of the compass rose 14 is highlighted so that the adjacent numerals on the compass rose stand out and it is thereby apparent what the correct course readings are.

The radius of the protractor 12 is smaller than the width of the rectangular member 22, so that the upper longitudinal edge 24 is unobstructed. The edge 24 therefore offers an unobstructed straight line for drawing course lines between points on a chart.

The rectangular member 22 also has a number of fasteners 38 which may be snap type fasteners or the like fixedly positioned along its top, adjacent the edge 24. A detachable distance scale 40 having the counterpart of the fasteners 38' fixedly secured thereto is secured to the rectangular member 22, along the upper edge 24, for measuring the distance between points on the aforesaid course line drawn between points on a chart.

The rectangular member 22, the detachable distance scale 40 and the fasteners 38 (and 38') are all operatively positioned to permit the distance scale 40 to be used to extend the maximum distance or length of the course which can be plotted with the plotter 10, as illustrated in FIG. 2. The distance scale 40 is merely removed and repositioned on the rectangular member 22, so that the two fasteners 38 on the right hand side of the rectangular member and the two fasteners 38' on the left hand edge of the distance scale 40 secure the distance scale 40 to the rectangular member 22. Longer courses can thereby thus be easily and speedily plotted and the distance measured, without having to reposition the plotter 10 on the chart.

It may be noted that only a single scale is marked on the distance scale 40, hence any possible confusion as to the proper distance scale which is to be read is eliminated. A number of such distance scales 40, each of which has a differently calibrated scale thereon, can be used with the plotter 10 so that it is therefore universally applicable for use in marine or air navigation. It is only necessary that the scale of the chart being used be determined and the appropriate distance scale 40 be removably secured to the rectangular member 22.

Opaquing is provided on the rectangular member 22 immediately below the calibrations on the distance scale 40 so that the calibrations are highlighted for easy and quick determination. The plotter 10 therefore obscures a minimal amount of chart detail, since only opaquing to obscure the detail is immediately below the calibrations on the distance scale and at the two diametrically opposed indicators 34 and 35.

While it is preferred that only a single scale be provided on the distance scale 40, the four differently calibrated scales which correspond to the calibration of the four charts normally encountered in air navigation can be provided on the distance scale 40. The same is also true with respect to the scales of the four differently scaled charts normally encountered in marine navigation. In such cases, the distance scale 40 is made opaque and two scales are provided on each of its sides. Also, the two scales on one side are made readable in opposite directions, or are inverted with respect to one another, and also have the calibrations thereon printed in different colors. With such an arrangement, a slightly greater amount of chart detail is obscured, but each of the scales normally required are available, on a single distance scale 40. Clarity is therefore sacrificed to a small degree, for convenience.

To measure the distance and the true course between two points on a chart, whether it is an air or marine chart, the appropriate removable distance scale 40 is first secured to the rectangular member 22, either as shown in FIG. 1 if the width of the rectangular member 22 is sufficient to span the distance, or as shown in FIG. 2 if a longer straight edge is needed. The plotter 10 is placed on the chart, with the upper edge 24 aligned between the two points and with the zero calibration over the first point so that the distance may be read on the distance scale 40 over the second point.

The rectangular member 22 is then held fixed against the chart and the protractor 12 rotated so that all of the grid lines 19 having the arrowheads 36 on their one end point to True North. With this plotter, this is easily accomplished by merely orienting any one of the grid lines 19 over, or in parallel with, a meridian line on the chart. The true course is now indicated on the compass rose 14, over the arrow on the indicator marker 34 or 35 on the lower edge of the plotter, depending upon the direction of travel.

To determine the corrected magnetic course, the plotter 10 is positioned to read the True Course, in the manner described above, and a mark is placed on the chart under the South reference, in this case, the 180-degree calibration on the compass rose 14. The magnetic variation is determined from the magnetic rose, or from the isogonic line, on the chart and this variation value is automatically compensated for by rotating the protractor 12 to align the calibration on the auxiliary West-East scale 18 which corresponds to the variation value opposite the mark placed on the chart. The Magnetic Course is then read over the arrow on the indicator marker 34 or 35, in the same manner as described above.

Magnetic deviation can be corrected for in the same manner. Furthermore, it may be noted that magnetic variation and deviation can both be corrected for, in one continuous manipulation. For example, assume that the magnetic variation is 20 degrees West and that the deviation is 5 degrees East. The plotter 10 is positioned to read the True Course, in the manner described above, and a mark is placed on the chart under the South reference, or 180-degree calibration. The protractor 12 is then rotated, to align the 20th calibration on the West scale opposite the mark placed on the chart. As indicated above, the Magnetic Course is now indicated over the arrow on the indicator marker 34 or 35. To correct for the magnetic deviation, the protractor 12 is next rotated toward the East scale 5 degrees, which corresponds to the deviation, using the same pencil mark and starting with the 20th calibration on the West scale as the reference point. The course, corrected for both magnetic variation and deviation, is read over the arrows on the indicator marker 34 or 35.

From the above description, it is readily apparent that several advantages are derived from placing the auxiliary West-East scale 18 on the protrator 12 and in cooperative relationship with the South reference of the chart, rather than on the rectangular member 22 or on the protractor 12 in some other reference position. For example, the present arrangement eliminates any confusion as to which direction the protractor should be rotated since the West and East scales both extend in those directions, rather than in the opposite directions, as is generally the case with the previously mentioned arrangements. The movement is therefore natural, rather than contrary, and there is less likely to be confusion to the beginner, in particular. Also, this arrangement permits the magnetic variation and/or deviation to be automatically compensated for, without having to reposition the plotter 12, as in the past, with the prior arrangements.

To plot a line in a given direction from a given point, the given direction, for example, that obtained from a radio beacon or the like, is preset on the plotter 10 by rotating the protractor 12 to align the corresponding calibration on the compass rose 14 with one of the arrows on the indicator marker 34, or 35, depending upon the particular direction of the bearing. Without disturbing the setting of the protractor 12, the upper edge 24 of the rectangular member 22 is aligned with the given point. A pencil point or the like is preferably held directly over the given point so that the plotter 10, or its upper edge 24, can be easily aligned in this manner. The plotter 10 is then rotated against the pencil point until the grid lines 19 on the protractor 12 are pointed to True North, by aligning one of the grid lines 19 with a meridian line on the chart. A line drawn along the upper edge 24 from the given point in the direction of the arrow on the indicator marker 34 or 35, will indicate the given direction from the given point. If the distance from the given point is known, the exact position with respect to the given point may be plotted by setting the zero calibration directly over the given point and by marking the corresponding distance on the drawn line, in accordance with the calibrations on the distance scale 40.

From the above description of the manner in which the plotter 10 is used, it may be seen that each of the described computations can be made in one continuous operation, with a minimum amount of manipulation of the plotter 10. Also, it is generally unnecessary to reposition the plotter 10 to measure and plot longer courses, since the removably secured distance scale 40 can be used to extend tthe length of the upper edge 24 of the rectangular member 22. It is apparent that in measuring a distance, with the upper edge 24 extended, the distance between the left hand edge of the rectangular member 22 and of the distance scale 40 is merely added to the distance measured on the distance scale 40 to a given point. A course can therefore be easily and quickly measured and plotted with the plotter 10, and by merely securing the appropriate distance scale 40 to it, it may be used to plot courses on both marine and air charts.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. A navigation instrument having an elongated straight edge member having two paralle lolng straight edges and protractor means along one straight edg ethereof, the other one of said straight edges being unobstructed, a plurality of snap fastener means secured to said member in spaced relation along said unobstructed straight edge, and at least one removable distance scale having correspondingly positioned snap fastener means thereon which are adapted to removably affix said distance scale to said instrument adjacent to and in alignment with said unobstructed straight edge, whereby a distance scale having calibrations corresponding to the scale of a chart upon which a course is to be plotted and measured can be removably affixed to said instrument.

2. The navigational instrument of claim 1 wherein said elongated straightedge member and said distance scale are transparent and further including opaquing thereon beneath said distance scale to highlight said distance scale.

3. The navigation instrument of claim 1 wherein said distance scale and said snap fastener means for removably affixing said distance scale to said instrument are adapted to adjustably position said distance scale to extend the length of said unobstructed straight edge.

4. A navigation instrument of claim 1 wherein said distance scale has a plurality of differently calibrated scales thereon arranged in a fashion such that only one of said calibrated scales is readable when affixed to said instrument.

5. A navigational instrument as claimed in claim 1 wherein said protractor has a compass rose thereon adjacent its peripheral edge, and a radius smaller than the width of said rectangular straight edge member, said protractor being pivotally secured on one of said long straight edges so that the other one of said long straight edges is unobstructed.

6. A navigational instrument as claimed in claim 5 wherein said distance scale has a plurality of differently calibrated scales thereon arranged in a fashion such that only one of said calibrated scales is readable when said distance scale is affixed to said instrument.

7. The navigational instrument of claim 5 wherein said distance scale and said snap fastener means for removably affixing said distance scale to said instrument are adapted to adjustably position said distance scale to extend the length of said unobstructed straight edge.

8. The navigational instrument of claim 5 wherein said elongated straightedge member and said protractor are transparent and further including opaquing on said rectangular straight edge beneath the peripheral edge of said protractor at diametrically opposite positions to highlight a predetermined portion of said compass rose at each of said diametrically opposite positions.

9. The navigational instrument of claim 5 further including an auxiliary scale on said protractor cooperatively aligned with and adjacent to the 180° calibration of said compass rose for compensating for magnetic variation and deviation.

10. The navigational instrument of claim 6 wherein said elongated straightedge member and said distance scale are transparent and further including opaquing on said rectangular straight edge member beneath said distance scale so as to highlight said distance scale.

11. A navigational instrument comprising, in combination: a transparent elongated rectangular straight edge member having two parallel long straight edges; a transparent protractor having a compass rose thereon adjacent its peripheral edge, said protractor having a radius smaller than the width of said rectangular straight edge member and pivotally secured on one of said long straight edges so that the other one of said long straight edges is unobstructed; a transparent distance scale; means for removably affixing said distance scale to said instrument adjacent to and in alignment with said unobstructed straight edge member and for adjustably positioning said distance scale to extend said unobstructed straight edge; opaquing on said rectangular straight edge member beneath said distance scale so as to highlight said distance scale and beneath the peripheral edge of said protractor at diametrically opposite points, the latter opaquing formed so as to highlight a predetermined portion of said compass rose at each of said diametrically opposite points; and an auxiliary scale on said protractor cooperatively aligned with a portion of said compass rose for compensating for magnetic variation and deviation.

References Cited by the Examiner
UNITED STATES PATENTS

| | | | |
|---|---|---|---|
| 775,951 | 11/1904 | Trant | 33—105 X |
| 798,721 | 9/1905 | Wilson | 33—161 X |
| 843,374 | 2/1907 | Sturgeon | 33—107 |
| 1,003,764 | 9/1911 | Little | 33—79.1 |
| 1,091,461 | 3/1914 | Russo | 33—107 |
| 2,277,965 | 3/1942 | Edwin | 33—76 |
| 2,545,935 | 3/1951 | Warner. | |

FOREIGN PATENTS

| | | |
|---|---|---|
| 742,754 | 1/1933 | France. |
| 873,692 | 3/1942 | France. |
| 1,130,540 | 10/1956 | France. |
| 1,163,997 | 5/1958 | France. |
| 15,785 | 7/1893 | Great Britain. |
| 273,443 | 7/1927 | Great Britain. |
| 567,915 | 3/1945 | Great Britain. |
| 431,829 | 3/1948 | Italy. |

LEONARD FORMAN, *Primary Examiner.*

ISAAC LISANN, *Examiner.*

H. N. HAROIAN, *Assistant Examiner.*